(12) United States Patent
Liu et al.

(10) Patent No.: US 8,848,591 B2
(45) Date of Patent: Sep. 30, 2014

(54) SYSTEM AND METHOD FOR MESSAGE ACKNOWLEDGMENT FEEDBACK FOR DEVICE-TO-DEVICE COMMUNICATION OVERLAID ON A CELLULAR NETWORK

(75) Inventors: Deping Liu, Schaumburg, IL (US);
Philippe Sartori, Algonquin, IL (US);
Yunsong Yang, San Diego, CA (US);
Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 194 days.

(21) Appl. No.: 13/406,462

(22) Filed: Feb. 27, 2012

(65) Prior Publication Data
US 2013/0223318 A1    Aug. 29, 2013

(51) Int. Cl.
*H04H 20/71* (2008.01)

(52) U.S. Cl.
USPC ............ 370/312; 370/329; 370/310; 370/280

(58) Field of Classification Search
USPC .................................. 370/312, 329, 310, 280
See application file for complete search history.

(56) References Cited

U.S. PATENT DOCUMENTS

| | | | |
|---|---|---|---|
| 2008/0267168 A1* | 10/2008 | Cai et al. | 370/352 |
| 2009/0103500 A1 | 4/2009 | Malkamaki et al. | |
| 2010/0240312 A1 | 9/2010 | Peng et al. | |
| 2011/0098043 A1 | 4/2011 | Yu et al. | |
| 2011/0205928 A1 | 8/2011 | Pelletier et al. | |
| 2011/0255450 A1* | 10/2011 | Wang et al. | 370/280 |
| 2011/0261729 A1 | 10/2011 | Ahn et al. | |
| 2011/0268006 A1 | 11/2011 | Koskela et al. | |
| 2011/0268056 A1 | 11/2011 | Soong et al. | |
| 2012/0093098 A1* | 4/2012 | Charbit et al. | 370/329 |
| 2012/0155337 A1* | 6/2012 | Park | 370/280 |
| 2013/0279459 A1* | 10/2013 | Lee et al. | 370/329 |

FOREIGN PATENT DOCUMENTS

| | | |
|---|---|---|
| CN | 101772199 A | 7/2010 |
| CN | 102088736 A | 6/2011 |
| WO | 2010049801 A1 | 5/2010 |
| WO | 2010082084 A1 | 7/2010 |
| WO | 2010109303 A2 | 9/2010 |
| WO | 2010139847 A1 | 12/2010 |

OTHER PUBLICATIONS

International Search Report and Written Opinion of the International Searching Authority for International Application No. PCT/CN2013/071550, mailed May 16, 2013, 10 pages.

(Continued)

*Primary Examiner* — Huy D Vu
*Assistant Examiner* — Kuo T Chiang
(74) *Attorney, Agent, or Firm* — Slater & Matsil, L.L.P.

(57) ABSTRACT

An embodiment of a system for operating a communications controller for a group of user equipments engaged in a direct mobile communication ("DMC") link in a wireless communications system is provided. The communications controller is configured to allocate a set of subframes to the group of UEs for the DMC link, signal the set of allocated subframes to the group of UEs, and signal a length of a sliding window to the group of UEs. In an embodiment, ACK/NACK feedback for communications over the DMC link is aggregated according to the length of the sliding window, and the ACK/NACK feedback for the communications over the DMC link is determined independently from ACK/NACK feedback for cellular transmission between the communication controller and the group of UEs. In an embodiment, the length of the sliding window is a number of subframes.

20 Claims, 10 Drawing Sheets

(56) References Cited

OTHER PUBLICATIONS

International Search Report and Written Opinion of the International Searching Authority for International Application No. PCT/US2013/027437, mailed Apr. 25, 2013, 13 pages.
International Search Report and Written Opinion of the International Searching Authority for International Application No. PCT/US2013/027374, mailed Apr. 25, 2013, 10 pages.
International Search Report and Written Opinion of the International Searching Authority for International Application No. PCT/US2013/26878, mailed May 21, 2013, 8 pages.
Lee, J., et al., "MIMO Technologies in 3GPP LTE and LTE-Advanced," EURASIP Journal on Wireless. Communications and Networking, 2009, 10 pages, vol. 2009, Article ID 302092.
Zhang, L., et al., "HARQ Feedback for Carrier Aggregation in LTE-A TDD," 2011, 6 pages, 202.194.20.8, ICC2011/DATA/03-057-11.PDF.
Corson, M., et al., "Toward Proximity-Aware Internetworking", IEEE Wireless Communications, Dec. 2010, pp. 26-33.
Qualcomm, "FlashLinq: Enabling Autonomous Proximal Communications", Corporate R&D, Qualcomm Proprietary and Confidential, May 2011, pp. 1-43.
Wu, X., et al., "FlashLinQ: A Synchronous Distributed Scheduler for Peer-to-Peer Ad Hoc Networks", Forty-Eighth Annual Allerton Conference, Allerton-House, UIUC, Illinois, USA, Sep. 29-Oct. 1, 2010, pp. 514-521, IEEE.
"3$^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.2.0, Jun. 2011, 54 pages.
"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Jun. 2011, 294 pages.

* cited by examiner

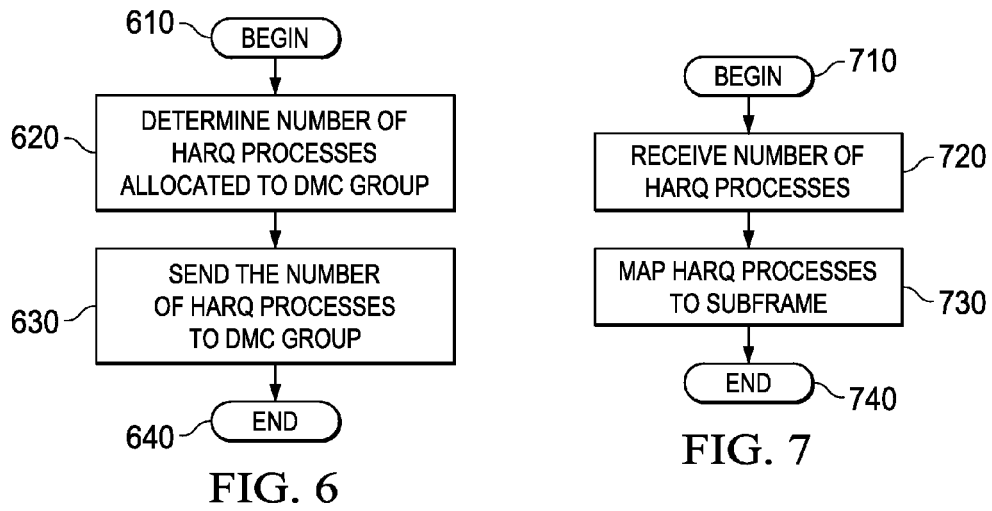
FIG. 6
FIG. 7
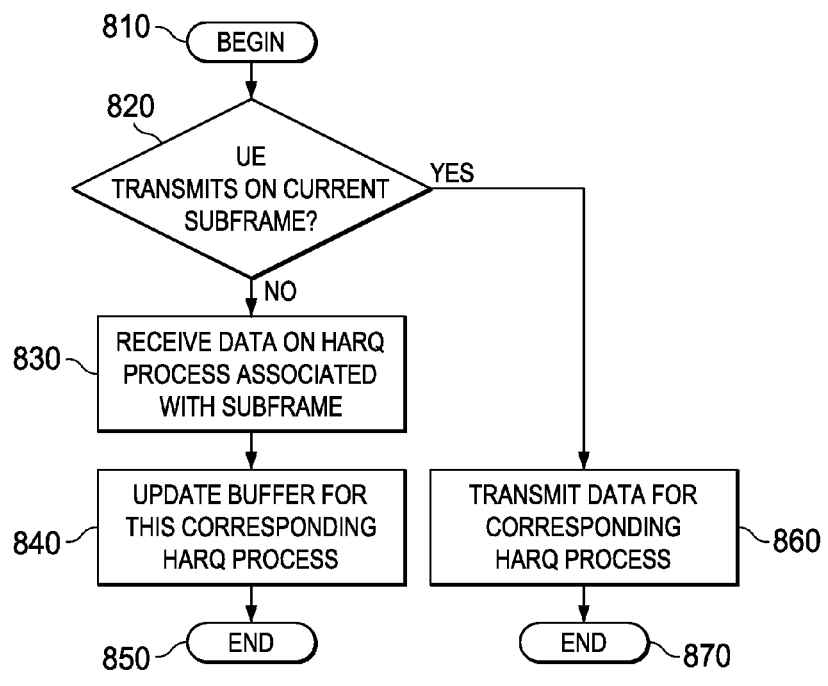
FIG. 8

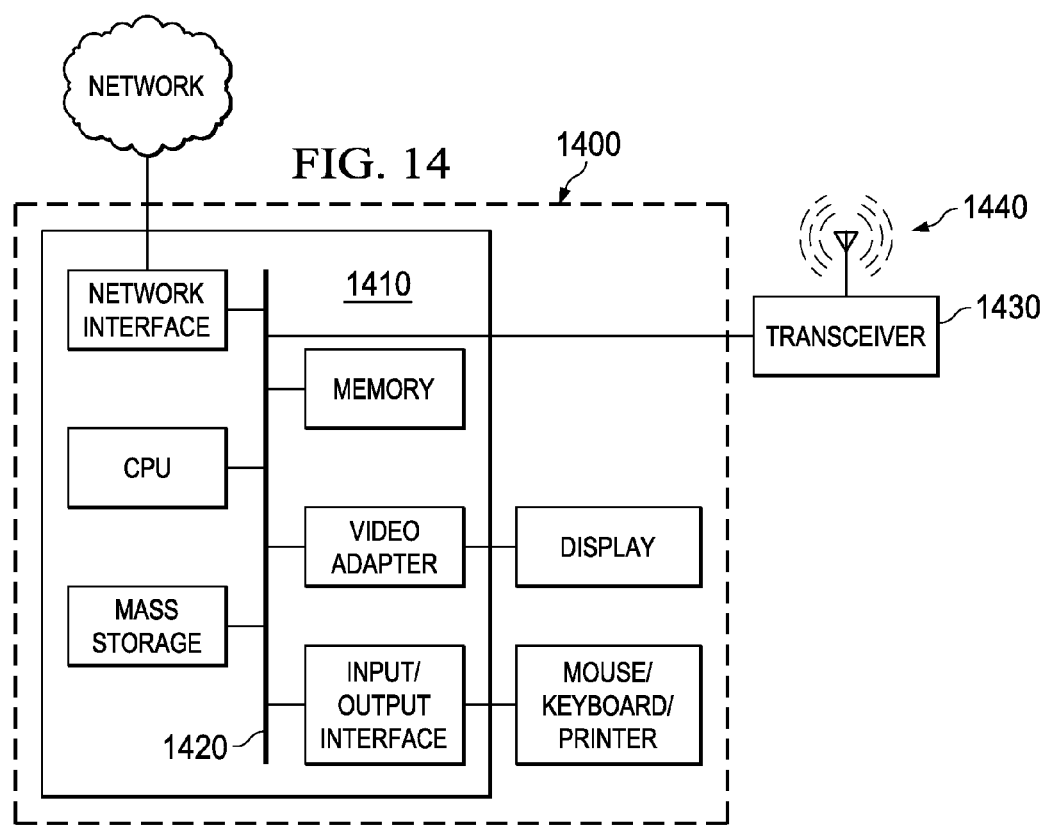

SYSTEM AND METHOD FOR MESSAGE ACKNOWLEDGMENT FEEDBACK FOR DEVICE-TO-DEVICE COMMUNICATION OVERLAID ON A CELLULAR NETWORK

TECHNICAL FIELD

The present invention relates generally to a system and method for digital communications, and more particularly to a system and method for operations enabling direct mobile communications in a wireless communication system.

BACKGROUND

In the field of wireless communication, there has been increasing demand for direct device-to-device communication ("D2D"), direct mobile communication ("DMC"), and the like. Both D2D and DMC refer to a communications mode between a group (two or more) of user equipments ("UEs") that does not include or does not always include a communications controller in a communication path between or among the UEs. DMC is used herein to denote this form of communication. Generally, a DMC link involves direct communications between a group of DMC devices occurring as point-to-point ("PTP") communications, either as point-to-single-point, or as point-to-multipoint, without having the communications passing through and being fully controlled by a communications controller, such as an evolved NodeB ("eNB"), a NodeB, a base station, a controller, a communications controller, and the like. DMC devices are commonly referred to as a user equipment ("UE"), a mobile station, a mobile, a communications device, a subscriber, a terminal, and the like. A DMC link is different than a cellular link. A cellular link between UEs involves data shared between the UEs transiting through a network infrastructure node such as an eNB, relay node, or the like. Note however, that for a DMC link, while data is directly exchanged between the UEs, control information for the DMC link can still transit through a network node. DMC can enable a cellular network to offload a portion of its base station traffic. In addition to offloading base-station traffic, DMC also enables proximity-based advertisement for local business entities, which can be a revenue source for such entities. DMC can also enable an end user of a user equipment to find and identify nearby friends. Ad hoc-type services can also be provided among user equipments that are physically near each other. DMC is also a key enabler of local social networking.

Processes to provide performance enhancements for DMC would accelerate adoption of this communication form in the marketplace.

A process for a base station to reduce communication with user equipments desiring to communicate with each other without incurring unnecessary cost and overhead would facilitate offloading traffic from a base station.

SUMMARY OF THE INVENTION

Technical advantages are generally achieved by embodiments that provide a system and method for device-to-device operations in a wireless communication system.

In accordance with an example embodiment, a system and a method for operating a communications controller in a wireless communications system for a group of user equipments engaged in a DMC link are provided. For example, embodiments provide a system constructed with a transceiver and a processor coupled to the transceiver. The processor in conjunction with the transceiver is configured to allocate a set of subframes to the group of UEs for the DMC link, signal the set of allocated subframes to the group of UEs, and signal a length of a sliding window to the group of UEs. In an embodiment, ACK/NACK feedback for communications over the DMC link is aggregated according to the length of the sliding window, and the ACK/NACK feedback for the communications over the DMC link is determined independently from ACK/NACK feedback for cellular transmission between the communication controller and the group of UEs. In an embodiment, the length of the sliding window is a number of subframes.

Further embodiments provide a system and a method for operating a user equipment engaged in a DMC link in a wireless communications system. For example, embodiments can provide a system constructed with a transceiver and a processor coupled to the transceiver. The processor in conjunction with the transceiver is configured to generate ACK/NACK feedback for a group of HARQ processes over the DMC link, aggregating the ACK/NACK feedback according to a length of a sliding window and an allocation of a first set of subframes for the DMC link received from a communication controller, and transmitting the aggregated ACK/NACK feedback to other UEs in the group of UEs of the DMC link on a subframe from an allocation of a second set of subframes received from the communications controller. In an embodiment, the allocated second set of subframes is a subset of the allocated first set of subframes. In an embodiment, aggregating the ACK/NACK feedback includes identifying subframes that include the sliding window.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates an embodiment of communications controller operation with the new HARQ process;

FIG. 7 illustrates a flowchart of an embodiment of UE operations when the UE in a DMC group receives signaling including information about the maximum number of HARQ processes;

FIG. 8 illustrates a flowchart of an embodiment of UE operations for a HARQ process on a given subframe;

FIG. 14 illustrates a block diagram of elements of a processing system that can be used to perform one or more of the processes discussed hereinabove.

DETAILED DESCRIPTION OF ILLUSTRATIVE EMBODIMENTS

It should be appreciated that embodiments provide many applicable concepts that can be embodied in a wide variety of specific contexts. The specific embodiments discussed below are merely illustrative of specific ways to make and use an embodiment, and do not limit the scope of the invention.

DMC enables a cellular network to offload traffic to a wireless communication path without much involvement of a communications controller, e.g., a base station, in the communication link between UEs. DMC can also enable easy data transfers to and from diverse peripheral devices such as printers, cameras, personal computers, television receivers, etc., that are colocated in the physical environment of the end user. For example, devices within some radius, such as a distance (e.g., a distance of 50 meters) or by acceptable physical measures (e.g., power levels) of the end user could be considered colocated. Nonetheless, cellular operators generally desire to have DMC under their control for purposes of billing and accounting, management of carrier frequencies and interference, and overall management of network traffic to optimize available bandwidths.

Although the term "direct mobile communication" generally refers to a communication mode between user equipments that does not include a communications controller in a communication path between the UEs, it is contemplated herein that DMC refers generally to the concept of a group of communicating devices that need not include communication with a cellular base station.

An embodiment enables a communications controller to allow users to communicate with each other directly without incurring unnecessary cost or signaling overhead.

Figure 1:
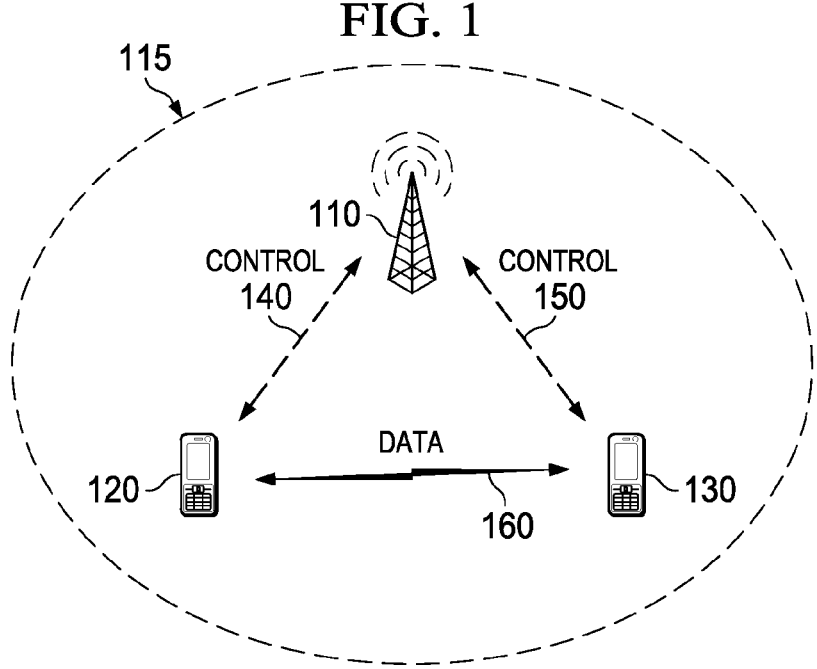
FIG. 1 illustrates a system drawing showing a base station that communicates in a cellular network with UEs that communicate with each other directly over a DMC link, illustrating an environment for application of the principles of an embodiment.

Referring to FIG. 1, illustrated is a system drawing showing a communications controller, e.g., an eNB 110, that communicates in a cellular link with a group of UEs (UEs 120, 130), and the UEs 120, 130 communicate with each other directly over a DMC link, illustrating an environment for application of the principles of an embodiment. The group of UEs comprises two or more UEs. The eNB 110 communicates control information with the UEs 120, 130 over uplink/downlink wireless communication links 140, 150. The served area 115 of the eNB 110 is indicated by the dashed line 115. The UEs 120, 130 directly communicate data with each other over DMC link 160.

A DMC link is a direct communication link between two or more UEs without much involvement of network functionality, such as provided by a communications controller, for the communication link between the two UEs, as shown in FIG. 1. There are two main ways of implementing DMC. In a device-centric arrangement, a DMC connection is without network oversight. In a network-centric arrangement, the network initiates the DMC connection between a group of UEs (DMC UEs) when conditions are appropriate and assist the DMC UEs to communicate with each other during a DMC link, for example, transmitting control information, allocating resources, etc. Conditions include local parameters such as the proximity of the devices as well as macro parameters, such as overall traffic demand, location of non-DMC devices, etc. A network-centric arrangement offers potential for offloading local traffic from the network, which is attractive to cellular operators.

With a network-centric approach, the DMC UEs need to be aware of which time resources (e.g., subframes) are allocated by a communications controller for the DMC group. Several processes to allocate resources are introduced herein for a DMC group. Processes are provided to ensure that HARQ timing is maintained, and for acknowledgment/negative acknowledgment ("ACK/NAK" or "ACK/NACK") feedback.

When a DMC link for a DMC group is established, resources are allocated for this group of UEs to communicate. Communication resources, both in time and frequency, are allocated to the DMC link. The allocation of the resources for DMC is addressed herein.

DMC can either be a single link with only two devices communicating, as shown in FIG. 1, or it can be multi-link, with multiple devices engaged in DMC. While a main focus is single-link DMC, multi-link DMC is also deemed of high interest from a business perspective. For instance, many users can set up a local multi-point DMC group as a local social network, for example, group-chatting within a high school, enabling the ability of several people to play games, or exchanging files by participants in a meeting. The processes introduced herein are targeted to allocate resources for both multi-link and single-link DMC. Communication resources are allocated efficiently for multiple UEs without excluding single-link UE pairs with high performance. In the following, a DMC group is taken as an example without losing commonality.

In order to keep UE complexity low, a half frequency-division-duplex ("FDD") communication protocol for the DMC link is assumed in the uplink band. Although FDD protocol is described, time-division-duplex ("TDD") communication protocol can also be used for DMC. This usage of the uplink band implies that a UE should not simultaneously receive and transmit on DMC resources. Consequently, if one UE is transmitting on the DMC link, the other DMC UEs should be prepared to receive. For the purpose of correctly transmitting and receiving a packet, the UEs involved in a DMC group (single-link or multiple-link) are informed when, the time resources, where, the frequency resources, and how, the related HARQ procedure, modulation and coding scheme ("MCS"), power, and multi-input/multi-output ("MIMO") scheme to transmit and receive.

To address the "when" aspect, consider for a general solution for a semi-static arrangement that a group of k (k>1) UEs is grouped together to establish a DMC group. Any UE within this group can communicate directly to other UE(s) within the group. The time resources are allocated to the UEs by higher layer signaling, e.g., radio resource control ("RRC") signaling from the communications controller or a control channel. Herein, a control channel comprises a physical downlink control channel ("PDCCH"), an enhanced physical downlink control channel ("ePDCCH"), a physical broadcast channel ("PBCH"), and the like. In order to simplify the description, the following assumptions are adopted:

In a first assumption ("P1"), only one UE transmits information at a given time within a DMC group, and in a second assumption ("P2"), an entire time transmit unit (time domain only), for example, a subframe, is allocated to a single UE.

Transmission or reception of information is understood to comprise transmission or reception of data and/or control information. A HARQ process is understood to manage a data transmission.

The first assumption (P1) eliminates the need for frequency multiplexing of DMC UEs. This relaxes constraints on power control, time, and frequency synchronization. The second assumption (P2) indicates that time-domain granularity is not necessarily needed, but makes the description simpler, i.e., the described processes could be applied with a different temporal granularity, such as a slot or a set of several subframes. However, considering practical constraints such as the need for a DMC UE to alternate between transmission and reception, latency constraints, etc., a temporal granularity of one subframe appears to be reasonable.

Figure 2:
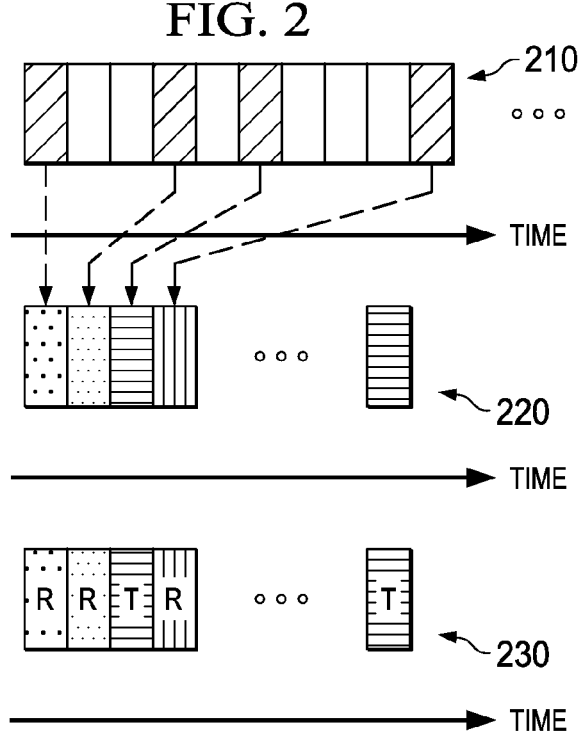
FIG. 2 illustrates a DMC time resource allocation process, in accordance with to an embodiment.

Turning now to FIG. 2, illustrated is a DMC time resource allocation process, in accordance with an embodiment. A DMC group is formed with four UEs, for example. A set of subframes, any of which can be used for cellular or DMC transmission, are indicated by the reference numeral 210. Ten subframes generally form a radio frame, periodically repeat in time. In various applications, the set of subframes can number 20 or 40, or another number, instead of ten. The communications controller performs several actions: Four subframes of the set of 10, indicated in FIG. 2 by crosshatching in 210, are allocated for DMC among the group of four UEs. The communications controller allocates a first set of subframes, the four subframes, indicated by the group 220 which periodically repeats over time with a period that matches the subframes 210, for DMC for the four engaged UEs. Collectively, the four UEs as a group can transmit information on any of the subframes allocated for DMC. Within the group of UEs, the communications controller decides which particular UE transmits information on a given subframe, as illustrated for the particular UE, crosshatched, in the group of subframes with reference numeral 230. The other UEs or some of the other UEs receive on that particular subframe. Accordingly, each UE is informed by the communications controller, using a second set of subframes, when to transmit information in the group of subframes allocated for DMC (i.e., the first set of subframes), and each UE can deduce in a complementary manner when to receive information. In another embodiment, the allocated subframes for the DMC group can be indicated to UEs in the group differently. For example, UE 1 can be indicated that 3 out of 10 subframes are allocated; UE 2 can be indicated that 4 out of 10 subframes are allocated, so UE 1 may not receive all the information transmitted by other UEs. In other words, only a subset of the subframes not allocated for transmission of information can be used for reception of information, although this complicates the HARQ process and timing.

Figure 3:
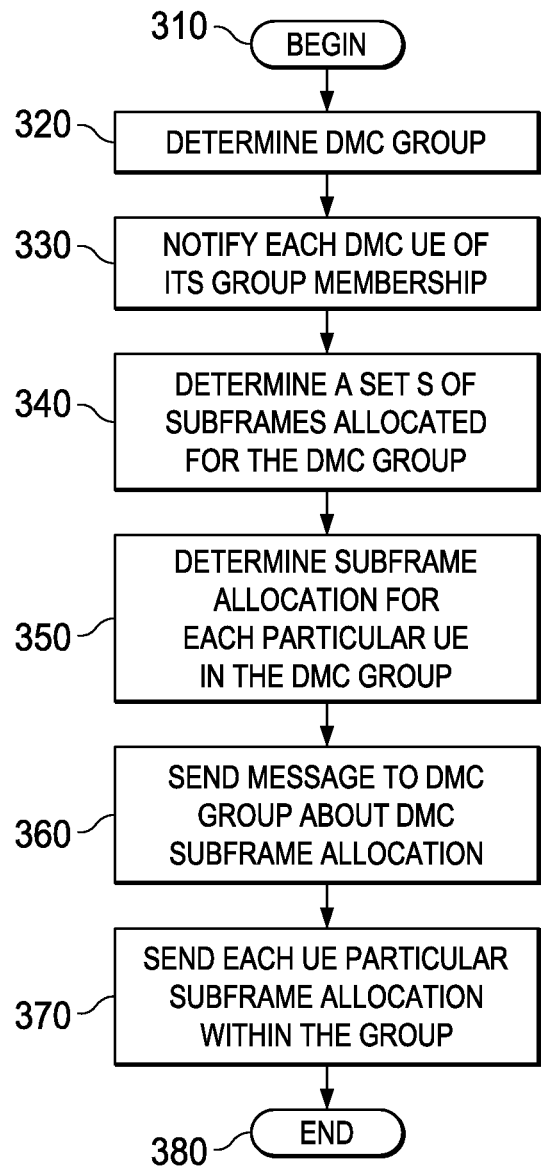
FIG. 3 illustrates a flowchart showing an embodiment of communications controller operation to inform each UE of a DMC group of particular communication time resources for the DMC group.

Turning now to FIG. 3, illustrated is a flowchart illustrating an embodiment of communications controller operation to inform each UE of the DMC group of the particular communication time resources for a DMC group, i.e., the particular subframe allocation. Based on this process, communications controller operation is as follows. The process begins in step or block 310. In step or block 320, the communications controller establishes a DMC group based on, e.g., a user request, observation of traffic patterns among UEs, etc. In step or block 330, the communications controller notifies each UE of its membership into the established DMC group. Notification can be sent by higher-layer signaling (e.g., RRC signaling), and could be either an individual message to each of the UEs, or a multi-cast message to the entire group.

In step or block 340, the communications controller determines a set S of subframes allocated to the DMC group that was formed, and determines in step or block 350 when each UE will transmit information and when it will receive information within the set of subframes S. In step or block 360, the communications controller informs the DMC group (e.g., by RRC signaling) of the subframe allocation for the particular group (a first set S), and, in step or block 370, informs each UE of the group of the particular subframe allocation within the group. The UE can transmit information on subframes of its particular subframe allocation (a second set). This second set is a subset of the first set. For each UE, the subframes of the first set not in the second set are allocated for receiving DMC transmissions of information from other UEs in the group of UEs. There can be several ways of conveying the information to the UEs. For example, steps 330, 360 and 370 can be implemented by a combined message or by a two-step message having 330 and 360 as a first step message, and 370 as a second step message. The process ends in step or block 380.

Time resource allocation for an entire DMC group can be an efficient multi-cast RRC message sent to the entire DMC group. Time resource allocation for a particular DMC UE within the DMC group can be either individual RRC signaling for each UE or multi-cast RRC signaling to all the UEs in the DMC group. Note that these two messages can be lumped into a single message. This is particularly attractive when there are only two DMC UEs in the group. Note also that in order to keep signaling as simple and with as low overhead as possible, the time resource allocation for a particular DMC UE can only indicate the UE to transmit information on a given subframe, with the implicit understanding that on any unassigned DMC subframe, the UE is to listen and potentially receive information.

Several alternatives can be employed for allocation of communication time resources for a DMC group.

A first alternative is to specify subframe assignment with a bitmap message.

This signaling can include two different bitmaps, one to indicate which subframes are allocated to the DMC group, and one to indicate which subframes are allocated to a particular UE. These two bitmaps can be sent in two different messages, or can be combined into a single bitmap sent in a single message.

Over a given period (e.g., 10 ms, 20 ms, or 40 ms), a bitmap message can be employed to indicate which subframes are collectively assigned to a DMC group, and/or to a particular UE in that group for transmission. A DMC subframe not assigned to the particular DMC UE for transmission is assumed by that particular DMC UE to be used for reception. In an alternative embodiment, the bitmap message indicates which subframes are collectively assigned to a DMC group, and/or to a particular UE in that group for reception. It is recognized that if a message designates a particular subframe for transmission, with the understanding that remaining subframes designated for reception, the message can be equivalently inverted to designate a particular subframe for reception, with the understanding that remaining subframes are designated for transmission. In the interest of brevity, the distinction between designating a particular subframe for transmission or for reception will not be further described herein.

Bits corresponding to DMC subframes in a bit map message can be assigned "1" when bits corresponding to non-DMC subframes are assigned, or "0," and vice versa.

The bits corresponding to a subframe for particular UE for transmission can be assigned "1," while "0" means that the subframe is for reception, or vice versa. Alternatively, if the bitmap is sent to several UEs or to all the UEs in the DMC group, a UE ID could be used to indicate if a subframe is allocated to a particular UE or not.

As an example, if the subframe period is 10 subframes, numbered 0, 1, 2, 3, ..., 9, and two UEs form a DMC group of size two, the communications controller can send a binary message "1010000000" to the DMC group, allocating subframes 0 and 2 to the group every 10 subframes. Subframes 0 and 2 represent the first set of subframes. The communications controller can send a second message "10" to the first UE, allocating the first DMC subframe to the first UE for transmission on the DMC link. For the first UE, the second set of subframes would contain subframe 0. The first UE also knows that it can transmit information on subframe 0. As a result of knowing the first and second sets, the first UE determines that it can receive information on subframe 2. The communications controller sends another message"01" to the second UE, allocating the second DMC subframe to the second UE for transmission. For the second UE, the second set of subframes would contain subframe 2. Any subframe not allocated to a particular UE for transmission is presumed in complementary fashion by that UE to be used for reception.

The eNB can combine the two messages into a single message, for example, by replacing the first bit "1" in message "1010000000" that allocates subframe 0 to the DMC group with two bits "10" that allocates the first subframe to the first UE to transmit information on a DMC link, replacing the second bit "1" that allocates subframe 2 to the DMC group with two bits "01" that allocates the third subframe to the second UE to transmit information on a DMC link, replacing each remaining "0" with two bits "00", etc., thereby producing a single message with twice as many bits for a group of two UEs.

Note that this process can be simplified by using a start-length or a start-end indication approach if the assigned subframes are adjacent. For example, a subframe allocation of 23, 24, 25 can be [23, 3] or [23, 25].

This process of assigning subframes is simple and can be attractive if the number of UEs in a DMC group is low, e.g., two. However, when more than two UEs are in a DMC group, there are some drawbacks, for example, the overhead can be high. For example, if 40 ms period is adopted for DMC group subframe allocations, then 40 bits are needed for one indication of the subframes assigned to the group. If within the 40 ms, many subframes (e.g., 20) are assigned to a DMC group, then a sub-bit-map of 20 bits is needed, which is a substantial overhead.

A Round-Robin ("RR") process is another alternative to allocate DMC time resources for a particular UE with less overhead. The allocation is made over N repeating DMC subframes, and the number N, which sets the period of the repeating DMC subframes, can be the same as or different from the DMC resource allocation period. Each UE is assigned one or more of a set of L parameters $R_1, \ldots, R_L$. If f is the DMC subframe index which means renumbering subframes allocated for DMC from 0, 1, 2, 3, etc., the UE is allowed to transmit information on this subframe if there exists an integer i, $i \in \{1, \ldots, L\}$, for which $$f \bmod N = R_i, \quad \text{Equation (1)}$$

where "mod" is the modulo operation for the period of the repeating subframes. On all other DMC subframes, the UE listens (receives).

An example of this resource allocation approach is as follows. If four DMC UEs are in a group, and all have the same traffic requirements, then the number N of repeating DMC subframes can be set to 4. The first UE can have an R value of $R_1=0$, the second can have an R value of $R_2=1$, the third can have an R value of $R_3=2$, and the fourth can have an R value of $R_4=3$. This way, each UE is allocated one subframe to transmit information every fourth DMC subframe, and listens on the other three DMC subframes. When traffic is symmetric, a common N and only one R value for each UE can be enough.

When traffic is asymmetric, different UEs can be assigned different N values to adjust their respective period. For example, one UE among three can be assigned an N value of 2 and an R value of 0, so the UE transmits in the first subframe every 2 DMC subframes. Another UE among the three can be assigned an N value of 4 and an R value of 1, so that UE transmits information in the second subframe every 4 DMC subframes. The third UE among the three can be assigned the N value of 4 and an R value of 3, so that UE transmits information in the fourth subframe every 4 DMC subframes. Accordingly, a DMC subframe is uniquely and periodically assigned to one of the three UEs.

Alternatively, there can be a common N value, and potentially plenty of R values are needed. As a consequence, instead of providing a set of individual R values, there are other ways of providing the R values when there are multiple R values to lower overhead.

For example, a range of values $[R_1, R_2]$ can be sent to a particular UE by start-length or start-end approaches.

A set of three values, $R_0$ for an initial R value, $S_t$ for a step value, and M for a number of R values, can be provided. The set of R values is then determined by:

$$R = R_0 + k \times S_t, k \in \{0, M-1\}. \quad \text{Equation (2)}$$

A combination of mechanisms can be used for resource allocation.

The subframe index f can be defined. For small values of R and N, it could be the subframe index in a radioframe, or in a set of 40 subframes (such as what is done for an MBSFN configuration subframe), or the subframe number within a DMC subframe period (e.g., if 10 subframes are assigned for DMC transmission, then the subframe number within the period is an integer from 0 to 9), or any other fixed value. However, this solution lacks flexibility, as explained earlier. A better solution that scales well with the number of users and degree of asymmetry is to compute f as follows:

$$f = 10 \times [SF]_i + j, \quad \text{Equation (3)}$$

where the subframe index $SF_i$ is the radioframe index within a superframe (e.g., SFi=0, ..., 1023), and j is the subframe index within the radioframe.

The message to send the parameters to the UEs can be a higher-layer signaling message, for example, an RRC message, and can be multicast or unicast.

Figure 4:
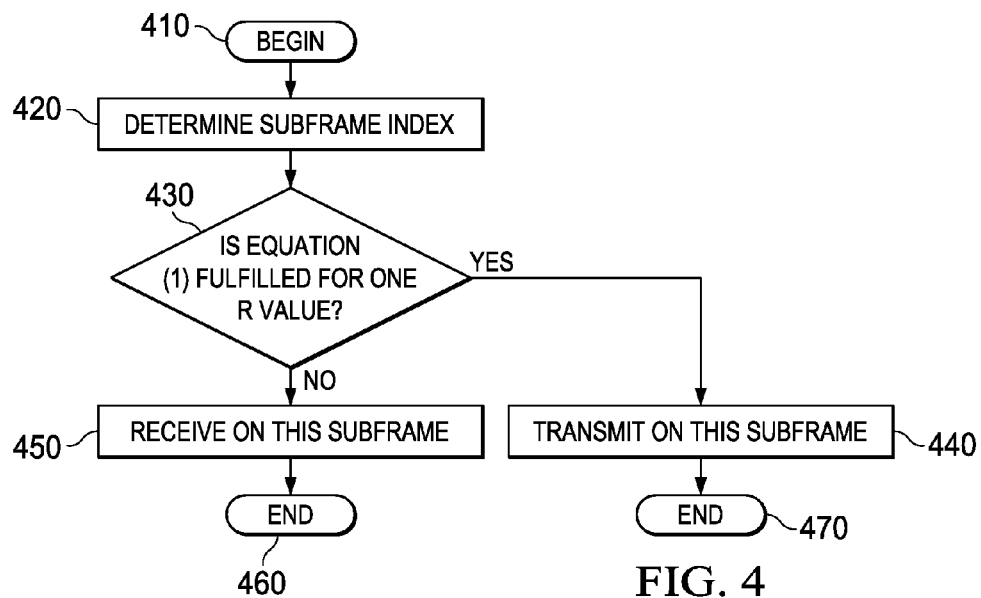
FIG. 4 illustrates a flowchart of an embodiment of UE operations to determine whether to transmit or receive.

Turning now to FIG. 4, illustrated is a flowchart of an embodiment of UE operations to determine whether to transmit or receive information. For illustrative purposes, it is assumed that Equation (1) is implemented but a different equation can be used. The UE process begins in step or block 410. In step or block 420, the UE determines the subframe index f. In step or block 430 the UE determines if Equation (1) is satisfied for one of its assigned R values. If Equation (1) is satisfied, in step or block 440 the UE can transmit information on this subframe, and the process ends in step or block 470. If Equation (1) is not satisfied, in step or block 450 the UE receives information on this subframe, and the process ends in step or block 460. Thus, the UE is directed to receive information when Equation (1) is not satisfied.

A Round-Robin solution can also be used to allocate time resources for a DMC group and the UEs in that group. For example, the start-end or start-length method can be used to list all the resources for DMC transmission within a certain period of time (10 ms, 40 ms, etc.). Then the UEs are listed corresponding to the resources.

For example, for a start-end method with a period of 10 ms, the time resources are [3,4], [5,7], the corresponding UEs are [UE1, UE2]. Thus, UE1 is supposed to transmit information on the first group of time resources, subframe 3 and 4, and UE2 is supposed to transmit information on the second group of time resources, subframe 5, 6, and 7.

Another process employing predefined configurations is a third alternative and uses some type of signaling to indicate a predefined configuration for the DMC group, similar to what is done in LTE Release-8 to indicate the uplink/downlink ("UL/DL") subframe configuration. For instance, if it is signaled that a TDD configuration 0 is used, it means for this predefined configuration that subframes 0 and 5 are DL subframes, subframes 1 and 6 are special subframes, and the other subframes are UL subframes.

A similar solution could be used for DMC, with a predefined set of configurations to indicate what mode the DMC UE has to use. Such an example of a set of configurations is given in Table 1 below illustrating examples of DMC subframe configurations that can be assigned to a particular UE, in accordance with an embodiment. In this example, the table indicates uplink resource allocation in an FDD mode. An entry "T" in the table means that the device transmits information in a DMC link, "R" means that the device receives information in a DMC link, and "C" means that the device is in a cellular mode. Note that while only five configurations are shown, in practice, it is likely that there would be more.

TABLE 1

Examples of DMC Subframe Configurations

| | Subframe index | | | | | | | | | |
|---|---|---|---|---|---|---|---|---|---|---|
| | 0 | 1 | 2 | 3 | 4 | 5 | 6 | 7 | 8 | 9 |
| configuration 0 | T | C | C | T | R | R | T | R | R | T |
| configuration 1 | T | T | C | T | R | C | T | T | R | T |
| configuration 2 | T | T | T | T | C | T | T | T | T | R |
| configuration 3 | T | T | T | R | T | T | T | C | T | R |
| configuration 4 | T | C | C | R | R | T | C | C | R | T |

In Table 1, some subframes are denoted as being in a cellular mode. Such subframes may not need to be further described with the two-step messaging structure described earlier. A first message could indicate with an index which subframes are used for DMC link, and the DMC subframe configuration could be applied to those DMC subframes only. In that case, a small issue arises. The number of DMC subframes may vary, whereas such a table is of fixed length. In such a case, only the first rows are used, or only the rows corresponding to the occupied subframes are used. Note also that Table 1 is defined for 10 subframes, corresponding to one radioframe. Other values, such as 40 could be used.

A TDD configuration of subframes of a group of predefined configurations can thus be identified by an index for DMC use by a DMC group. The preset TDD binary pattern "1110000000" can indicate by an associated index that the first three subframes are used for the DMC link and the other seven are used for the cellular link. A second binary pattern, which can also be identified by an index, can be employed to identify which of the subframes assigned for DMC links are assigned to a first UE for transmission, and which are assigned to the first UE for reception. For example, the binary pattern "110" can be used to communicate to the first UE that the first two DMC subframes are assigned to the first UE to transmit, and the third subframe for the first UE to listen.

The process introduced herein can be applied to any number of DMC UEs in a DMC group. However, the number of configurations grows with the number of DMC UEs. As a consequence, this process may not be attractive for more than two DMC users. Two different RRC messages can be sent to the DMC UEs, or a single message can be multicast to the two DMC UEs. In that case, one UE has to interpret "T" as "R," i.e., transmit as receive. This can be done, e.g., by having the first UE interpret "T" as "T," and the second UE interpreting "T" as "R."

There are several benefits of this process. The mechanism simplifies DMC UE resource allocation by decomposing a complex procedure into an indication of opportunities for each individual UE, with implicit indication of non-transmit (i.e., receive) resources. A UE only needs to know when to transmit; all the other DMC resources are receive opportunities.

Further time resource allocation can be indicated by one message. There is no need to dynamically send two copies of one scheduling grant to differentiate which UE is to transmit and which UE is to receive. For example, one scheduling grant identified by the group ID can be transmitted to the group of UEs to indicate the frequency resource allocation, modulation and coding scheme "MCS," and so on by physical layer, the grant can be valid in following multiple subframes allocated to the UE group.

Since a UE knows when it should receive a DMC transmission, it can prepare itself to receive that transmission.

In addition to knowing which subframes are assigned for transmission, it is also important to have a mechanism for the DMC UEs to indicate where and when to receive. In particular, it is necessary to know when a given HARQ process will be transmitted and/or acknowledged.

The HARQ process is a combination of forward error-correcting coding and error detection using the Automatic Repeat reQest ("ARQ") error-control process. In standard ARQ, redundant (error detection) bits are added to data to be transmitted using an error-detecting code such as cyclic redundancy check ("CRC"). In HARQ, forward error correction ("FEC") bits (such as a Reed-Solomon code, a convolutional code, or a Turbo code) are added to the existing Error Detection ("ED") bits to correct errors, while relying on ARQ to detect uncorrectable errors.

In practice, incorrectly received coded data blocks are often stored at the receiver in a buffer rather than discarded, and when the retransmitted block is received, the stored and retransmitted blocks are combined. This is called HARQ with soft combining. While it is possible that two given transmissions cannot be independently decoded without error, it may happen that the combination of the previously erroneously received transmissions provides enough information to correctly decode. There are two main soft combining methods in HARQ.

One soft-combining method is "chase combining," wherein every retransmission contains the same information (data and parity bits). The receiver can use maximum-ratio combining to combine the received bits with the same bits from previous transmissions. In other implementations, log-likelihood ratios can be combined. Because all transmissions are identical, chase combining can be seen as additional repetition coding. Essentially, each retransmission adds extra energy to the received transmission and thereby increasing the signal-to-noise ratio ("$E_b/N_0$").

Another soft-combining method is "incremental redundancy," wherein every retransmission contains information possibly different than the previous one. Multiple sets of coded bits are generated, each representing the same set of information bits. The retransmission typically uses a different set of coded bits than the previous transmission, with different redundancy versions generated by puncturing the encoder output. Thus, at every retransmission the receiver gains extra knowledge and can increase the quality (e.g., signal-to-noise ratio) of some received values, e.g., log-likelihood ratios.

When the retransmission occurs at a fixed timing relative to the initial transmission, the process is called synchronous HARQ. When the retransmission timing is more flexible, it is called asynchronous HARQ. When asynchronous HARQ is employed, it is necessary to identify the particular HARQ transmission associated with a particular packet. Synchronous HARQ can simplify the HARQ procedure and save overhead.

In a conventional cellular mode, a UE maintains a certain number of its own HARQ processes, for example up to 8 HARQ processes for a 3GPP LTE FDD UE to receive packets in parallel on the downlink, up to 8 HARQ processes for a 3GPP LTE FDD UE to transmit packets in parallel on the uplink, up to 15 HARQ processes for a 3GPP LTE TDD UE to receive packets in parallel on the downlink, and up to 8 HARQ processes for a 3GPP LTE TDD UE to transmit packets in parallel on the uplink. It is noted that the two sets of HARQ processes of a UE for transmission and reception are independent in the cellular mode. At the network side, the communications controller maintains a HARQ entity for each UE at its media access control ("MAC") layer, so multiple HARQ entities, each entity having multiple HARQ processes for a UE, are simultaneously maintained by the communications controller.

In DMC mode, if a UE needs to manage a group of HARQ processes for each peer UE in a DMC group, the soft buffer requirements can be quite large. Each peer may potentially be the biggest data provider during a DMC session, so it is neither good nor desirable to reduce the HARQ process number of any UE in advance. Furthermore, buffer preservation increases in proportion to the number of DMC UEs in a DMC group.

Having the DMC UE operate like the communications controller with multiple HARQ entities would require a lot of new functionalities, which would require drastic changes for both software and hardware.

In a cellular mode, at the physical layer, a UE does not know from where the data are originating. The UE just knows the data are sent from the communications controller. Identification of the source is left to a higher layer. For DMC mode, this burden should not be imposed on a UE to know the data sources in the physical layer as well. However, a DMC UE needs to identify who is sending data in order to perform HARQ combining if conventional HARQ is adopted. It is noted that each UE in the DMC group manages HARQ processes for the DMC link and HARQ processes for the cellular mode. Each UE configures its HARQ processes for the DMC link and manages those processes using parameters provided by the communications controller. As a result, the HARQ processes for the DMC link and HARQ processes for the cellular mode are distinct and independently determined. From a communications controller perspective, it does not use any HARQ processes for the DMC for cellular communication.

A new HARQ protocol is introduced herein to perform HARQ in a DMC mode.

It is assumed that UE subframe allocation has already been performed, i.e., the subframes allocated for the DMC link and the subframes allocated for UE transmission over the DMC link. Extensions to other resource allocation procedures are straightforward. An embodiment of a process lets the involved UEs share and maintain a common set of HARQ processes for both transmission and reception of information that are tied to the timing of the commonly allocated DMC resources.

The process can be described as follows. Synchronous HARQ is assumed, so the retransmission timing/subframes are predefined, but the interval between the transmissions can be variable depending on the subframes allocated to the UE group. Each DMC subframe is allocated, implicitly or explicitly, a HARQ process using parameters sent by the communications controller. A way of allocating a HARQ process number is to signal the maximum number of HARQ processes to the UEs in the particular DMC group, to exclude all subframes not allocated to the particular DMC group, and to number the HARQ processes sequentially according to the allocated subframes.

Each UE in a DMC group maps one or more HARQ processes according to the subframe number of the DMC subframes. The HARQ process numbers can be derived from the subframes allocated to the DMC group after the maximum number of HARQ processes is obtained from the communications controller. The maximum number of HARQ processes can be related to the number of UEs in the group, such as the maximum numbers of UEs in the group. Each subframe allocated to the DMC group will be mapped to a HARQ process no matter which UE will transmit in the subframe. The maximum number of HARQ processes can be derived from the communications controller configuration, for example, the number of DMC subframes in a period of DMC subframe/radio frame allocation. In one example, if four of every ten subframes are allocated for information (i.e., with a period of ten subframes) to a DMC group, e.g., subframes identified by the binary sequence "1100110000" which indicates that subframes zero, one, four, and five in each radio frame are allocated to the DMC group, then the total number of HARQ processes can be four and the HARQ process numbers associated with the allocated DMC subframes could be zero, one, two, and three. In this example, each UE of the group maps its group of HARQ processes for the DMC link to the set of allocated subframes. It is noted that the UE can have a same HARQ process number for the DMC link and the cellular mode but those HARQ processes are determined independently. Or the maximum number of HARQ processes can be number of subframes in a period of DMC subframe/radio frame allocation minus one, herein is 3, then the HARQ process numbers associated with the allocated DMC subframes could be zero, one, two, and one. Another example, if the total number HARQ processes are configured by higher layer (RRC layer) of eNB as H, where H is a positive integer, then the HARQ process numbers associated with the allocated DMC subframes could be zero, one, two, . . . , (H−2), and (H−1). If H is 7, then the total HARQ processes associated with DMC subframes will be 0, 1, 2, . . . , 5, and 6. The maximum number of HARQ process can also be configured through control channel comprising PDCCH, ePDCCH, PBCH, and the like.

On each subframe when it is not transmitting, the UE receives, as described previously hereinabove. Since the UE knows which HARQ process is transmitted on a given subframe, the UE can unequivocally perform HARQ combining on any subframe in which it receives data.

Figure 5:
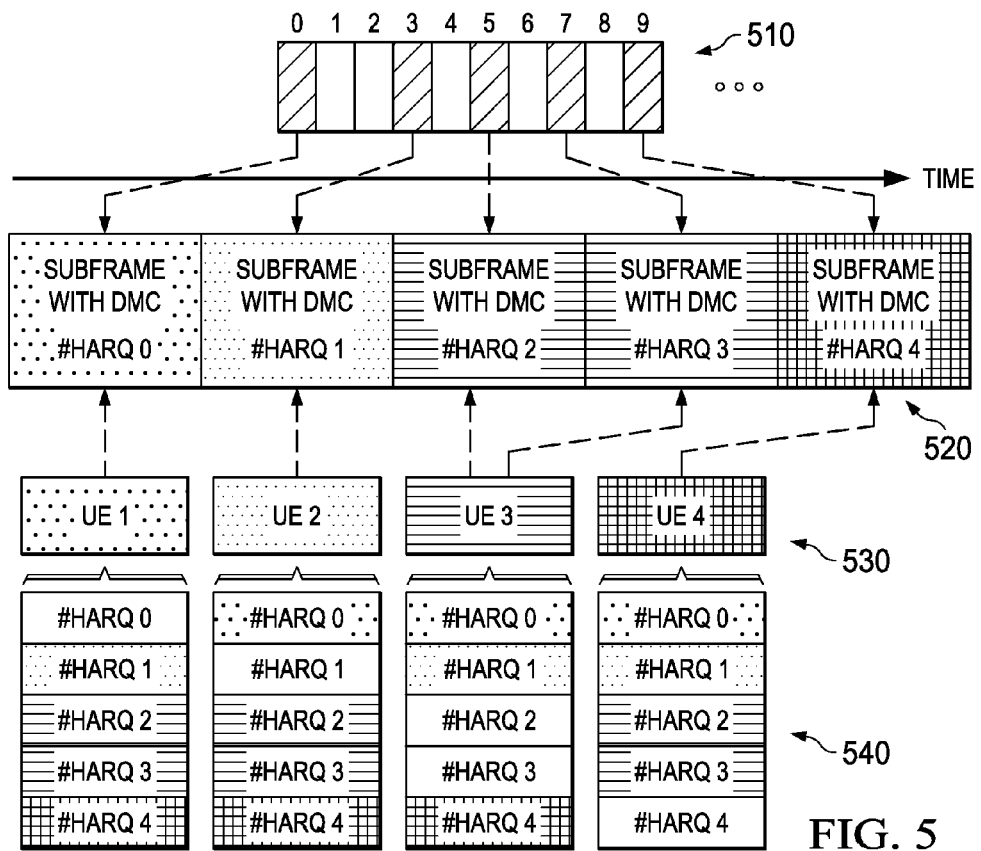
FIG. 5 illustrates an example of mapping Hybrid Automatic Repeat reQuest ("HARQ") processes to allocated subframes, in accordance with an embodiment.

Turning now to FIG. 5, illustrated is an example of the new HARQ process, in accordance with an embodiment. A repeating pattern of subframes, 510, numbered 0, 1, 2, 3, . . . , 9, includes certain subframes for DMC links, and certain subframes for cellular communication links. Subframes 0, 3, 5, 7, and 9 are allocated to a group for DMC transmission, and are identified with crosshatching. The subframes broken out in the group 520 are sequentially associated with (mapped to) five HARQ process numbers, 0, 1, 2, 3, and 4. In the group of four UEs 530 that form the DMC group, UE1, UE2, and UE4 have been assigned, respectively, subframes 0, 3, and 9 for information transmissions. UE3 in the group 530 has been assigned subframes 5 and 7 for information transmissions.

The five HARQ processes 540 are shown below each UE in the DMC group. Each UE is allocated one or more subframes for transmission and the accordingly associated HARQ process to use to reconstruct received data. Each UE receives all the other HARQ processes of the associated subframe in which it is not transmitting. UE1 does not need to employ HARQ process 0 in the receiver to reconstruct data in subframe 0 because it transmits in subframe 0. Accordingly, HARQ process 0 under UE1 is not crosshatched. It is noted that UE1 must manage HARQ process 0 even though it is transmitting data for this process. Similarly, the HARQ processes under the other UEs associated with their respective transmissions are not crosshatched.

Turning now to FIG. 6, illustrated is an embodiment of the corresponding communications controller operation. Note that this process would most likely run at the same time as the subframe allocation process. The process begins in step or block 610. In step or block 620, the communications controller determines the maximum number of HARQ processes it wants to transmit to the DMC group. The number can be same as or different from the number of time resources assigned for DMC time resource period. Note that these HARQ processes (for the DMC group) are independent from the cellular HARQ processes, and do not share the same HARQ pool of cellular HARQ processes. For instance, there might be a HARQ process number 1 for cellular operation, and another HARQ process number 1 for a specific DMC group operation. In step or block 630, the communications controller can transmit to the DMC group the maximum number of HARQ processes allocated to this group if the number of HARQ processes is different from the number of time resources assigned for DMC time resource period. The communications controller may not need to inform UEs explicitly of the maximum number of HARQ process if the number of the HARQ processes is same as the number of time resources assigned for DMC time resource period. An option for this signaling is RRC signaling. Note that the number of HARQ processes could also be jointly sent with the subframe allocation process. The process ends in step or block 640.

Turning now to FIG. 7, illustrated is a flowchart of an embodiment of UE operations when the UE in a DMC group receives the HARQ signaling including information about the maximum number of HARQ processes. In an embodiment, the UE can just assume the number of the HARQ processes for DMC is the same as the number of the time resources in DMC time resource period. The process begins in step or block 710. In step or block 720 the UE gets the (maximum) number of HARQ processes from the communications controller. In step or block 730, depending on the number of HARQ processes and the allocation of subframes to the DMC group, the UE determines which specific HARQ process is associated to a particular subframe by sequentially associating the HARQ processes to the subframes assigned to the DMC group. The UE then associates the HARQ processes corresponding to all the subframes assigned to the DMC group. The process ends in step or block 740.

Turning now to FIG. 8, illustrated is a flowchart of an embodiment of UE operations on a given subframe. On all the subframes where the UE does not transmit information on the DMC link, it receives information on the DMC link and updates the corresponding HARQ process. The operations illustrated in FIG. 8 are performed after those illustrated in FIG. 7.

If a UE is added to the group or leaves the group, communications controller may need to reconfigure time resource allocation and the HARQ process allocation as well.

The process begins in step or block 810. In step or block 820, the UE determines whether to transmit on the current subframe on the DMC link. The UE receives from the communications controller a set of subframes for transmission on DMC link. If the UE determines it is time to transmit, in step or block 860 the UE transmits information in the subframe associated to a HARQ process. The process ends in step or block 870. If the UE determines in step or block 820 that it does not transmit information in the current subframe, then in step or block 830, the UE receives information over the DMC link in the current subframe associated with the HARQ process. The allocated DMC subframes not used for transmission over the DMC link can be receiving DMC transmissions over the DMC link. In step or block 840 the UE updates the buffer of this corresponding HARQ process. The process ends in step or block 850.

With this operation, the new data indicator ("NDI") bit of the current packet can be used to indicate how the receiver should combine the current data packet with previous version(s). If the NDI indicates the packet is an initial transmission, the UE empties the buffer of the corresponding HARQ process. If the UE does not decode the newly-received packet correctly, it buffers the newly-received packet(s); if the NDI indicates the packet is retransmission, the UE combines the newly-received packet with previously received versions in the HARQ process buffer. The NDI bit can be sent together with its corresponding data, but coded separately so that the involved UEs can first decide to combine newly-received packet with previously received versions in the HARQ process buffer, or just discard the old packet version.

There are several benefits of this process. A UE can receive data, combine packages of initial transmissions and retransmissions, and decode the data packets before knowing the source for the data. It is assumed here that the scrambling and reference signal sequence group is the same within a DMC group which can be identified or defined by the group ID. The receiver can then just blindly combine the data packets according to the subframe number. There is no necessity to have the physical layer know the identity of the source. With an assumption of one HARQ process per time resource, the memory needed in DMC mode can be anticipated in advance. In general, the amount of memory needed for a UE in DMC mode is much less than the communication controller's requirement for uplink transmissions, where the amount of memory is related to the number of active UEs and the number of HARQ processes per UE. The feedback can also be tied to timing.

More than one packet can be transmitted in one HARQ process, so multiple acknowledgement/negative acknowledgement ("ACK/NACK", "A/N") bits can be fed back; for simplicity, in the following text, one packet is used, and ACK/NACK feedback is used to denote the whole feedback for a HARQ process. For sending a HARQ ACK/NACK, after a UE receives a packet, it takes a certain period of time, the HARQ processing time, to process the packet and prepare the corresponding ACK/NACK feedback. The ACK/NACK feedback corresponding to a HARQ process for a packet cannot be available and be sent, before the processing time is complete. For LTE, the processing time should not be more than four subframes (4 ms).

In the cellular mode, a packet received by a UE on the DL must be acknowledged to the communications controller on a predefined subframe on the UL. In FDD mode, a DL packet is acknowledged four subframes after being received. In TDD mode, a DL packet is allocated to the first UL subframe at least four subframes after the DL packet has been received. It is noted the ACK/NACK feedback for the cellular mode is determined separately and independently from the ACK/NACK feedback between a group of two or more UEs in the DMC mode.

For the DMC mode, the UEs can operate in a half-duplex manner. Receiving and transmitting are not performed simultaneously. If dedicated independent ACK/NACK feedback opportunities are assigned to UEs for the HARQ processes on the DMC link, the ACK/NACK overhead will consume resources available for information transmission. Furthermore, it also complicates the higher layer configuration for transmission timing. In an embodiment, the ACK/NACK feedback is grouped with, and accompanies, an information transmission. The ACK/NACK feedback can be encoded with, or separately from, the data. In an embodiment, the ACK/NACK feedback is encoded separately from the data. In this manner, a UE feeds back ACK/NACK when it has an opportunity to transmit data. This ACK/NACK feedback is transmitted on the DMC link. Since several HARQ processes can be ACK/NACKed together, some mapping rules are employed for DMC UEs.

In a first example, retransmission of the original data occurs automatically without ACK/NACK feedback.

If a set of ACK/NACKs is to be fed back, the overhead of the corresponding HARQ process number could be large, which wastes resources and degrades the decoding performance of the data channel (packet). Discarding ACK/NACK feedback could be one solution. In this case the transmitter just retransmits according to a predetermined maximum number of retransmissions. This solution can be efficient for transmission of small packets. However, for transmission of large packets, it is highly inefficient since unnecessary retransmissions may occur quite frequently.

In a second example the corresponding HARQ process number is provided with the ACK/NACK feedback explicitly. This solution ensures HARQ processes are correctly identified and acknowledged. The corresponding HARQ process number of an ACK/NACK feedback is explicitly indicated so that the packet source/transmitter can know if a given packet was correctly received in that particular subframe (which can be uniquely tied to a HARQ process, as described previously hereinabove).

Figure 9:
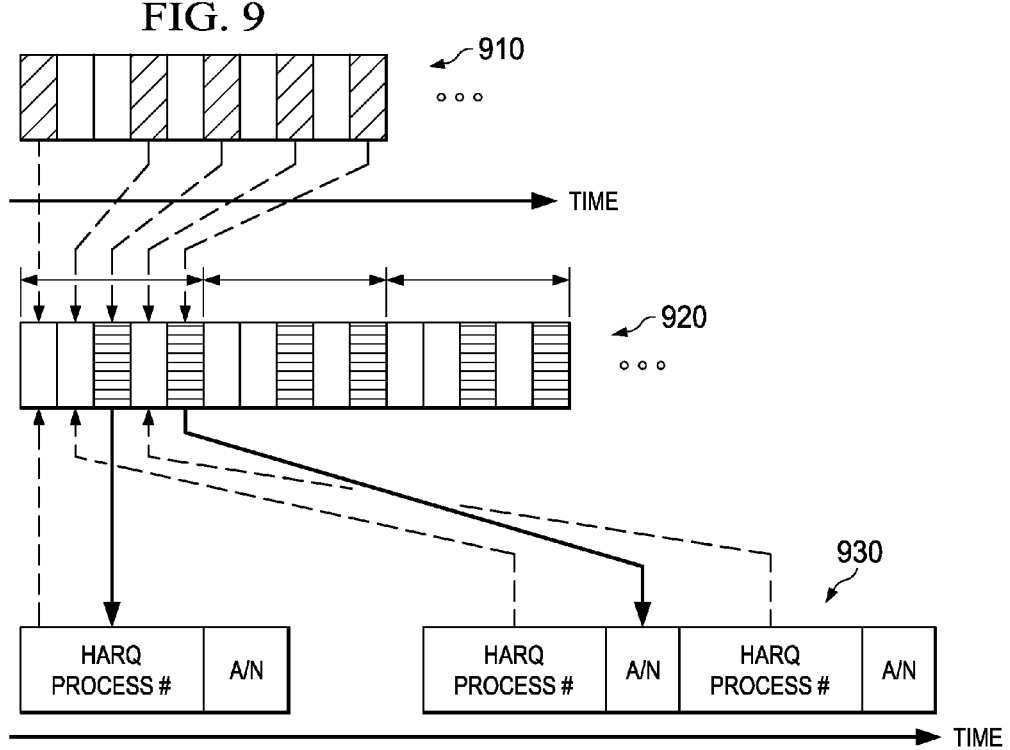
FIG. 9 illustrates a graphical representation of ACK/NACK feedback with explicit indication of an acknowledged HARQ process number.

Turning now to FIG. 9, illustrated is a graphical representation of ACK/NACK feedback with explicit indication of the corresponding HARQ process number, in accordance with an embodiment. A periodic pattern of ten subframes is indicated with reference number 910. Five subframes, which is an example number, in the periodic sequence 910 that are allocated to a group of UEs for DMC are crosshatched. The communication controller allocates this set of subframes for the DMC link and signals the set to the group of UEs. The subframes allocated for DMC are sequentially repeated in the group of subframes indicated with reference number 920. ACK/NACK feedbacks from the DMC UEs, indicated with reference number 930, provide the HARQ process numbers and the associated ACK/NACK feedbacks. The UE transmitting an ACK/NACK feedback in the crosshatched subframes acknowledges the received packets that were previously received, taking into account processing time. As illustrated by the ACK/NACK feedbacks indicated with reference number 930, the UE transmitting an ACK/NACK response indicates the HARQ process number being ACK/NACKed in addition to the actual ACK/NACK feedback field.

Figure 10:
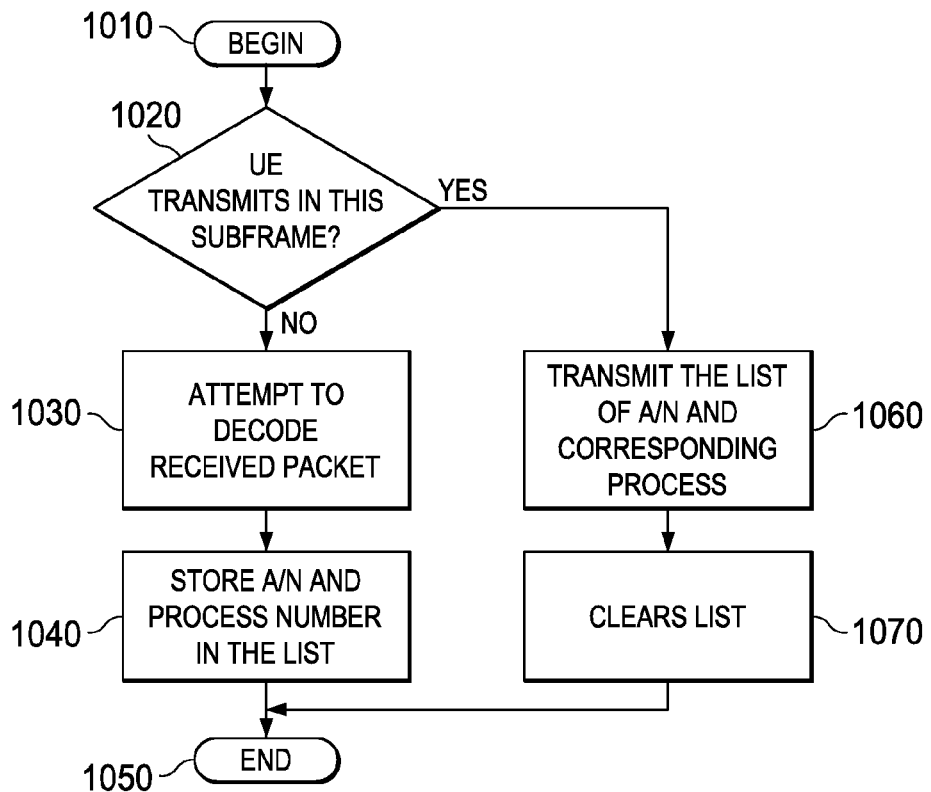
FIG. 10 illustrates an embodiment of a process performed at a UE for sending ACK/NACK along with an indication of the HARQ process number.

Turning now to FIG. 10, illustrated is an embodiment of a process performed at a UE for sending ACK/NACK and generating ACK/NACK for a HARQ process. The process begins in step or block 1010. In step or block 1020, the UE determines if it is supposed to transmit over the DMC link in the current subframe. The set of subframes for transmission over the DMC link is signaled to the UE by the communications controller. If it is not, in step or block 1030 it attempts to receive and decode the packet over the DMC link, potentially performing HARQ combining for a retransmission, and assessing whether the packet was correctly received. In step or block 1040, it records the ACK/NACK status for this HARQ process and the HARQ process number corresponding to the current subframe and stores the information to a list. The process then ends in step or block 1050. If in step or block 1020 the UE is to transmit in this subframe, in step or block 1060 the UE aggregates the contents of the list and transmits the aggregated ACQ/NACK feedback, and in step or block 1070 clears the list. It is noted that the UE generates an acknowledgement for its HARQ process (for its transmission) on this subframe. It is further noted that the UE can transmit data while it is transmitting the aggregated ACK/NACK feedback. The process ends in step or block 1050.

Figure 11:
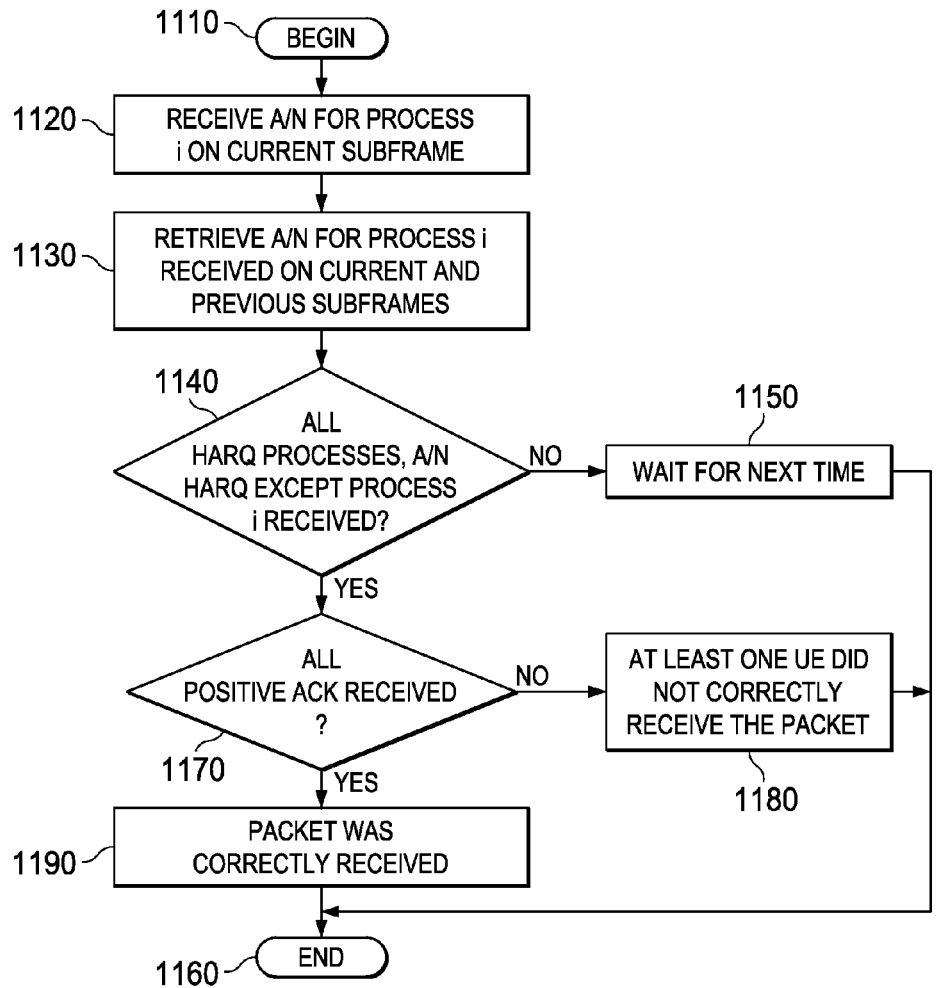
FIG. 11 illustrates an embodiment of UE operation to assess if a packet was correctly received by the other UEs in a DMC group when ACK/NACKs are sent by other UEs in the group.

Turning now to FIG. 11, illustrated is an embodiment of UE operation to assess if a packet was correctly received by the other UEs in a DMC group by examining the received ACK/NACK feedback. The process begins in step or block 1110. It is assumed that the UE is monitoring ACK/NACK for HARQ process "i." In this example, the UE transmitted a packet over the DMC link for HARQ process i. In step or block 1120, in a received subframe, the UE monitoring ACK/NACK for HARQ process i collects and stores the aggregated ACK/NACK feedback sent by the UE transmitting in that particular subframe. In step or block 1130, the UE retrieves from memory the aggregated ACK/NACK feedback corresponding to HARQ process i associated with this particular subframe, as well as in previous subframes. In step or block 1140, the UE then assesses if an ACK/NACK feedback of HARQ process i originating from UEs transmitting on all HARQ processes except i have been received. If not, in block or step 1150 the UE waits for the next subframe to collect more ACK/NACK responses. If yes, in step or block 1170 the UE checks if the received ACK/NACK from all HARQ processes were positive ACKs. If yes, in step or block 1190 the packet is identified as having been correctly received by all the receiving UEs. If not, in step or block 1180 the packet is identified as not having been correctly received, and the UE then initiates the HARQ retransmission procedure. The process ends in step or block 1160.

Note that the process might be altered slightly. For instance, if one UE reports that the packet was incorrectly received, the UE that originally transmitted the packet decides to retransmit the packet for HARQ process i before having received feedback from all HARQ processes, because at least one receiving UE was not able to correctly decode the packet.

In a third example, an embodiment employing sequential feedback reports a sliding window of DMC subframes for which ACK/NACK feedbacks will be provided. This process does not require explicitly sending the HARQ process number with the aggregated ACK/NACK feedback. This process is more systematic and can be simpler to implement. It can reduce ACK/NACK feedback overhead.

The third example is described as follows. A sliding window of length N for ACK/NACK feedback of each UE in a DMC group is set, e.g., by the network. The length N can represent a number of subframes. The sliding window length can be the same as or smaller than the number of allocated subframes for the DMC link or the maximum number of HARQ processes. All of the UEs in the DMC group know the sliding window length, which is either pre-configured by communications controller, or communicated by higher layer (RRC) signaling from the communications controller. When a given UE is to transmit, the UE transmits the aggregated ACK/NACK(s) for all N previously received HARQ processes/packages within the window. The aggregated ACK/NACK feedback can be multiplexed, such as using a bitmap, with a bit (or several bits) corresponding to a given HARQ process, and sequenced according to the DMC subframes in the sliding window. For instance, the first bit could correspond to the earliest subframe in the sliding window, and the last bit to the last subframe. Other sequencing arrangements can be employed. The aggregated ACK/NACK feedback can employ bundling, where feedback for all ACK/NACK processes within the window are logically ANDed together, similar to the bundling process in the time division duplex mode of LTE.

In addition, if within the window, there is a subframe or subframes where the UE transmits a packet or packets, and accordingly does not require feedback, the corresponding feedback for the packet(s) can just be an ACK(s).

The ACK/NACK feedback and other control information can be coded by a conventional linear block code, so the mapping from ACK to binary 0 will not degrade decoding performance.

Figure 12:
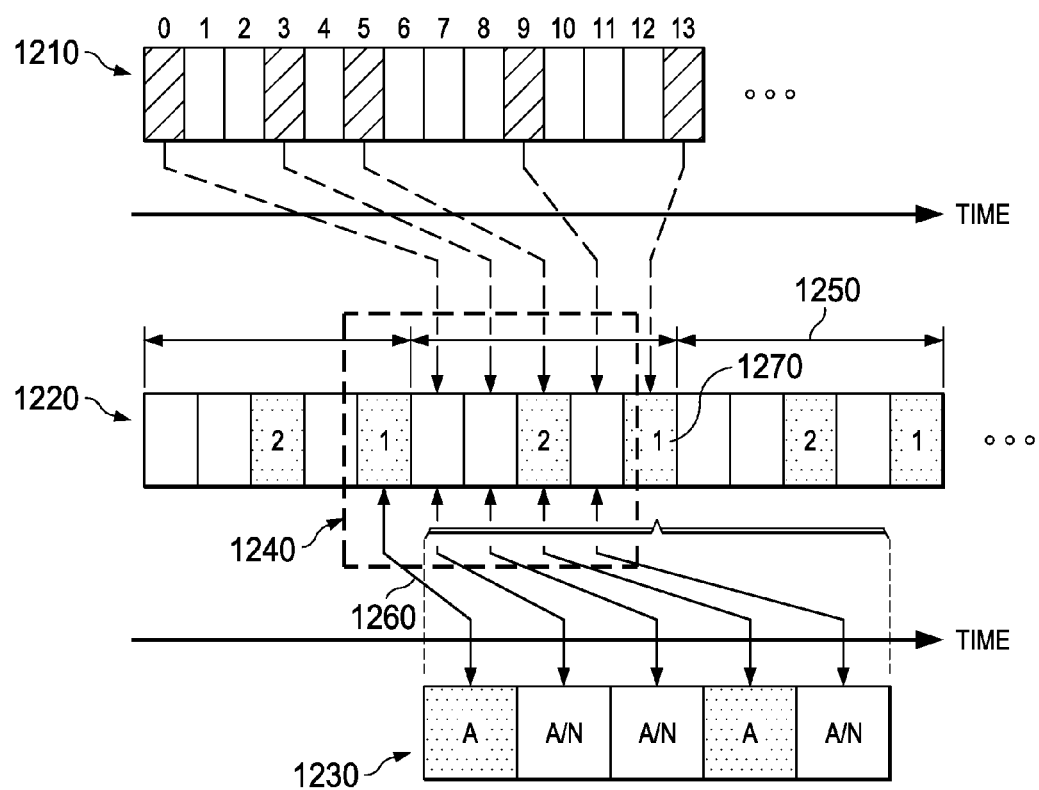
FIGS. 12 and 13 illustrate graphical representations of ACK/NACK reporting with a sliding window, in accordance with an embodiment.
Figure 13:
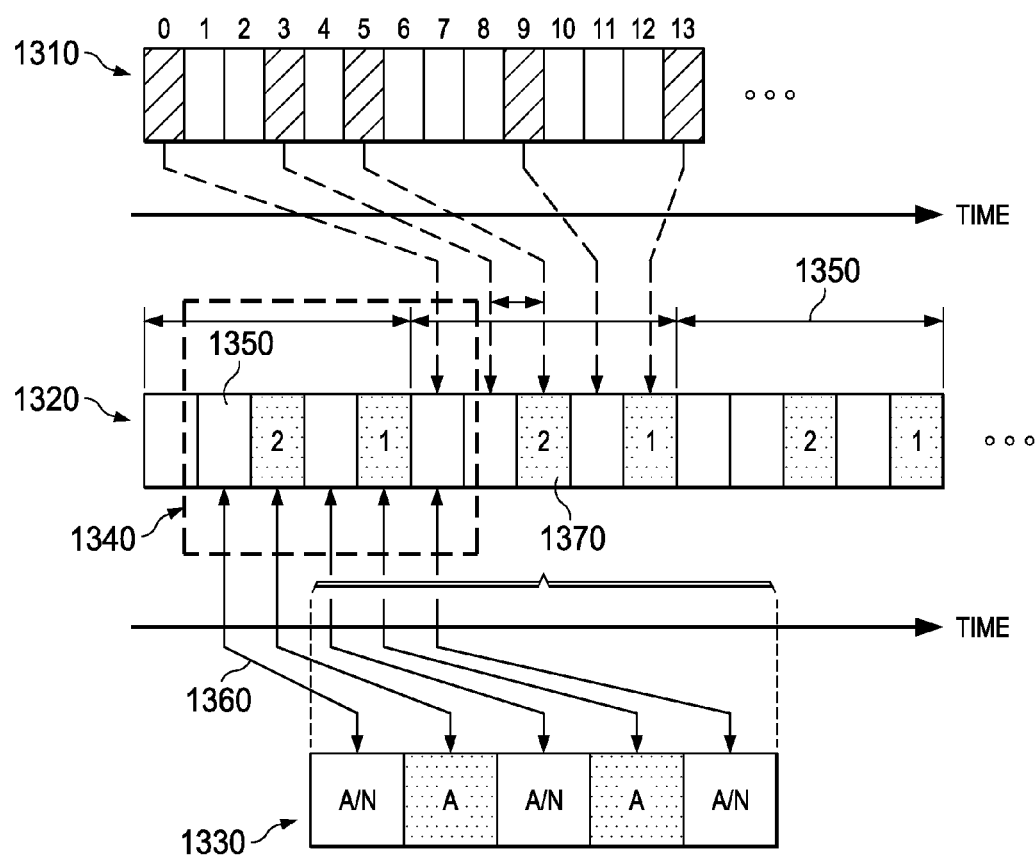

Turning now to FIGS. 12 and 13, illustrated is a graphical representation of ACK/NACK reporting with a sliding window for a first case and a second case, respectively, in accordance with an embodiment. UE operations have some similarities to the example described above for the second HARQ example, wherein explicit feedback of the HARQ process number is acknowledged, the difference now being updating by using a bitmap containing aggregated ACK/NACK feedbacks corresponding to subframe positions in the sliding window. The association of an ACK/NACK feedback with a HARQ process can be sequential, e.g., the first ACK/NACK response can be associated with the first subframe in the sliding window, or the association can be specified by a table.

The cases illustrated in FIGS. 12 and 13 illustrate the number of allocated subframes for DMC is 5 for given time resource period and a sliding window length of 5. In the example illustrated in FIG. 12, there is sufficient separation (processing time of 4 subframes) between subframes transmitting data in the sliding window (which corresponds to subframe #9 of 1210) and the subframe 1270 (which corresponds to subframe #13 of 1210) for ACK/NACK feedback after the sliding window 1240, but in the example illustrated in FIG. 13, there is insufficient separation of 2 subframes between the subframe ahead of 1370 (which corresponding to subframe #3 of 1310) and subframe 1370 (which corresponds to subframe #5 of 1310) for ACK/NACK feedback, so the sliding window 1340 cannot include the A/N for that subframe, illustrated by the double-headed arrow 1370. The collective cellular and DMC subframes in a frame are indicated by reference numerals 1210, 1310. The DMC subframe allocation for the engaged UEs in a DMC group is indicated by the crosshatched subframes in the frame 1210, 1310 (the subframe numbers are shown above 1210, 1310), and further by the periodic grouping of DMC subframes indicated reference numerals 1220, 1320. The DMC subframes allocated to a DMC UE in the group are shown by dotted boxes, among those illustrated by reference numerals 1220, 1320. The DMC UE is allocated two subframes for transmission (and their corresponding HARQ processes) in a time resource period, labeled as subframes "1" and "2" in FIGS. 12 and 13. The subframes to be ACKed are the ones in the sliding windows 1240, 1340. ACK/NACK feedback and its corresponding subframe are indicated by the double-headed arrows, such as by the double-headed arrows 1260 and 1360. ACK/NACK feedbacks for the subframes identified by the numerals 1 and 2 allocated to the UE among the engaged UEs in the DMC group is indicated among the feedbacks 1230 and 1330 only by an "A", or "N", not an "A/N," since this feedback is from a transmitting UE to itself, and the "A" or "N" is just a placeholder to keep the order of the feedbacks in the bitmap. Without loss of generality, an acknowledgement ("A") is used as a placeholder. The period of a frame 1210, 1310 is at fourteen subframes in this example, and the length of the sliding windows 1240, 1340 is five, indicated by the double-headed, horizontal arrows, for example by the double-headed, horizontal arrows 1250 and 1350.

The process can be further enhanced. If most of the DMC subframes or even all the DMC subframes are assigned to one UE, the UE has more chances to transmit, which means it has more chances to feed back ACK/NACKs. This can create a waste of resources since the same ACK/NACK can be reported multiple times. At the expense of a slightly more complex process at the receiver, the previously reported ACK/NACK might be omitted from future reports, though this makes the bitmap field length variable.

For a DMC group with 2 UEs, the ACK/NACKs can be easily fed back at the reception UE's first available transmitting chance, and then not transmitted any more. The feedback timing can be simplified. For example, the subframes carrying feedbacks can be configured semi-statically or can be dynamically signaled. Beside these subframes, no ACK/NACK will be transmitted.

Spatial domain bundling and time domain bundling as in a TDD system can also be used.

Several mechanisms related to the time resource allocation for a DMC group have been described. The covered aspects include a subframe allocation process, a HARQ timeline, and HARQ ACK/NACK reporting.

Referring now to FIG. 14, illustrated is a block diagram of elements of a processing system 1400 that can be used to perform one or more of the processes discussed hereinabove. One or more of the elements illustrated in FIG. 14 may not be necessary in a particular embodiment. For example, a user equipment may not comprise a mouse. The processing system 1400 comprises a processor 1410 equipped with one or more input/output devices, such as a mouse, a keyboard, a printer, or the like, and a display. The processor 1410 includes a central processing unit (CPU), memory, a mass storage device, a video adapter, a network interface, and an I/O interface connected to a bus 1420.

The bus 1420 can be one or more of any type of several bus architectures including a memory bus or memory controller, a peripheral bus, video bus, or the like. The CPU can comprise any type of electronic data processor. The memory can comprise any type of system memory such as static random access memory (SRAM), dynamic random access memory (DRAM), synchronous DRAM (SDRAM), read-only memory (ROM), non-volatile RAM ("NVRAM"), a combination thereof, or the like. In an embodiment, the memory can include ROM for use at boot-up, and DRAM for data storage for use while executing programs.

A transceiver 1430 coupled to an antenna 1440 is coupled to the bus 1420 to provide a wireless transmitting and receiving function for the processing system. For example, without limitation, the transceiver 1430 can provide a wireless transmitting and receiving function for a cellular communication network.

The mass storage device can comprise any type of storage device configured to store data, programs, and other information and to make the data, programs, and other information accessible via the bus. The mass storage device can comprise, for example, one or more of a hard disk drive, a magnetic disk drive, an optical disk drive, a remote disk, or the like.

The video adapter and the I/O interface provide interfaces to couple external input and output devices to the processor. Examples of input and output devices include the display coupled to the video adapter and the mouse/keyboard/printer coupled to the I/O interface. Other devices can be coupled to the processor, and additional or fewer interface cards can be utilized. For example, a serial interface card (not shown) can be used to provide a serial interface for a printer.

The processor also preferably includes a network interface, which can be a wired link, such as an Ethernet cable or the like, and/or a wireless link to enable communication with a network such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

It should be noted that the processing system can include other components. For example, the processing system can include power supplies, cables, a motherboard, removable storage media, cases, and the like. These other components, although not shown, are considered part of the processing system.

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems.

It is noted that, unless indicated otherwise, functions described herein can be performed in either hardware or software, or some combination thereof, with or without human intervention. In an embodiment, the functions are performed by a processor such as a computer an electronic data processor, such as that discussed hereinabove with reference to FIG. 14, in accordance with code such as computer program code, software, and/or integrated circuits that are coded to perform such functions, unless indicated otherwise.

Embodiments such as those presented herein thus provide a system and a method for operating a communications controller. For example, embodiments provide a system constructed with a transceiver and a processor coupled to the transceiver. The processor in conjunction with the transceiver is configured to allocate a first set of subframes to a group of UEs for a DMC link, allocate a second set of subframes to a particular UE in the group of UEs, transmit a first message including information about the first set of subframes to the group of UE, and transmit a second message including information about the second set of subframes to the particular UE. In an embodiment, the second set of subframes is a subset of the first set of subframes, the information about the second set includes subframes in which the particular UE may transmit to other UEs in the group of UEs, and subframes in the first set not in the second set are allocated for reception by the particular UE. In an embodiment, the first message and the second message are transmitted in a single message. In an embodiment, the first message is transmitted in a radio resource control signaling message. In an embodiment, the first message is transmitted on a control channel. In an embodiment, the second message is transmitted on a radio resource control channel. In an embodiment, the second message is transmitted on a control channel. In an embodiment, the first message transmitted to the group of UEs is addressed to all UEs in the group of UEs. In an embodiment, a bitmap message is employed to identify the first set of subframes and the second set of subframes. In an embodiment, a first bitmap field of the bitmap message is employed to identify the first set of subframes and a second bitmap field of the bitmap message is employed to identify the second set of subframes. In an embodiment, the second bitmap field is of different length than the first bit map field. In an embodiment, a function depending on at least a subframe index I is used to determine if a subframe of the index I is within the second set. An embodiment further includes assigning a parameter M and a parameter R to the particular UE in the group of UEs for the function, wherein the subframe of index I is assigned to the particular UE in the group to transmit if I mod M=R. An embodiment further includes assigning at least an additional parameter R to the particular UE in the group. In an embodiment, the subframe of the index I is indexed depending on its position in the first set. In an embodiment, a predefined configuration of subframes is employed to indicate the first set of subframes and the second set of subframes for transmission by the particular UE in the group. In an embodiment, a subframe in the first set not in the second set is employed for reception by the particular UE of the group. An embodiment further includes transmitting the first message to the group of UEs to identify the first set of subframes and the second message to the particular UE of the group to identify the second set of subframes for transmission by the particular UE. In an embodiment, the group of UEs is identified by a group identifier. In an embodiment, each UE of the group is referenced by a unique UE identifier within the group.

Further embodiments provide a system and a method for operating a user equipment. For example, embodiments can provide a system constructed with a transceiver and a processor coupled to the transceiver. The processor in conjunction with the transceiver is configured to receive a first message including information about a first set of subframes for a group of UEs for a DMC link, and receive a second message including information about a second set of subframes assigned to the particular UE. In an embodiment, the second set of subframes is a subset of the first set of subframes, the information about the second set includes subframes in which the UE may transmit in the DMC link to other UEs in the group, and subframes in the first set not in the second set are allocated for reception by the UE. A subframe in the first set not in the second set allocated for reception by the UE can be allocated to another UE for transmission. In an embodiment, the first message and the second message are received in a single message. In an embodiment, the first message is received in a radio resource control signaling message. In an embodiment, the first message is received on a control channel, such as a PDCCH. In an embodiment, the second message is received on a radio resource control channel. In an embodiment, the second message is received on a control channel, such as a PDCCH. In an embodiment, the first message is directed to all UEs in the group. In an embodiment, a bitmap message is employed to identify the first set of subframes and the second set of subframes. In an embodiment, a first bitmap field of the bitmap message is employed to identify the first set of subframes and a second bitmap field of the bitmap message is employed to identify the second set of subframes. In an embodiment, the second bitmap field is of different length than the first bitmap field. In an embodiment, a function depending on at least a subframe index I is used to determine if a subframe of the index I is within the second set. In a further embodiment, receiving a transmission including a parameter M and a parameter R, the subframe of index I is allocated to the UE if I mod M=R. A further embodiment includes receiving at least an additional parameter R. In an embodiment, the subframe index I is indexed depending on its position in the first set. In an embodiment, a predefined configuration of subframes is employed to identify the first set of subframes and the second set of subframes. A further embodiment includes receiving a first message addressed to the group of UEs to identify the first set of subframes and a second message addressed to the UE to identify the second set of subframes for transmission by the UE in the DMC link. In an embodiment, the group of UEs is identified by a group identifier. In an embodiment, the UE within the group is identified by a UE identifier.

Further embodiments provide a system and a method for operating a communications controller for a DMC link for a group of user equipments. For example, embodiments provide a system constructed with a transceiver and a processor coupled to the transceiver. The processor in conjunction with the transceiver is configured to allocate a set of subframes in one periodic group of subframes to the group of UEs, signal the allocated set of subframes to the group of UEs, and transmit parameters related to a group of HARQ processes of the DMC link. In an embodiment, the communication controller uses HARQ processes for cellular UE transmission that are determined separately and independently from HARQ processes of the group of HARQ processes for the DMC link, and the parameters are configured to enable the group of UEs to manage the group of HARQ processes for the DMC link. In an embodiment, the parameters related to the group of HARQ processes for the DMC link include a maximum number of HARQ processes. In an embodiment, the maximum number of HARQ processes is derived from at least a number of UEs in the group of UEs. In an embodiment, the maximum number of HARQ processes is derived from at least a number of subframes within the set of allocated subframes. In an embodiment, the maximum number of HARQ processes is equal to the number of subframes within the set of allocated subframes. In an embodiment, the maximum number of HARQ processes is derived from at least a configuration of the communications controller. In an embodiment, the maximum number of HARQ processes is derived from at least a number of subframes within the one periodic group of the allocated subframes. In an embodiment, a first HARQ process in the group of HARQ processes of the DMC link corresponds to a first subframe of the set of allocated subframes allocated to the group of UEs. In an embodiment, the HARQ processes of the DMC link are numbered according to the subframes allocated for the group of UEs. In an embodiment, the numbering is sequential. In an embodiment, the transmitting the parameters related to the group of HARQ processes is transmitted in a radio resource control signaling message. In an embodiment, the transmitting the parameters related to the group of HARQ processes of the DMC link is transmitted in a control channel.

Further embodiments provide a system and a method for operating a UE for a DMC link for a group of user equipments. For example, embodiments provide a system constructed with a transceiver and a processor coupled to the transceiver. The processor in conjunction with the transceiver is configured to receive from a communications controller an allocation of a first set of subframes for a group of UEs for a DMC link, and receive from the communications controller parameters related to a group of HARQ processes of the DMC link. In an embodiment, the UE manages a group of HARQ processes of a cellular UE transmission and at least one HARQ process from the group of HARQ processes of the DMC link, and the UE maps the at least one HARQ process from the group of HARQ processes based on the allocation of the first set of subframes and the received parameters. In an embodiment, the mapping of the at least one HARQ process includes mapping all HARQ processes from the group of HARQ processes of the DMC link. In an embodiment, a process number of a HARQ process from the group of HARQ processes of the cellular UE transmission is equal to a process number of a HARQ process from the group of HARQ processes of the DMC link. A further embodiment includes receiving an allocation of a second set of subframes from the communications controller wherein the allocated second set of subframes is a subset of the allocated first set of subframes, and wherein the UE may transmit in the allocated second set of subframes. In an embodiment, the transmitting uses the mapped at least one HARQ process from the group of HARQ processes. In an embodiment, the UE receives on the allocated first set of subframes that are not part of the allocated second set. A further embodiment includes receiving from another UE within the group of UEs in a subframe from the allocated first set of subframes using the mapped at least one HARQ process from the group of HARQ processes. A further embodiment includes transmitting a New Data Indicator bit. In an embodiment, the mapping of the at least one HARQ process from the group of HARQ processes is sequential to the allocated first set of subframes. In an embodiment, the receiving the parameters related to the group of HARQ processes of the DMC link is received in a radio resource control signaling message. In an embodiment, the receiving the parameters related to the group of HARQ processes of the DMC link is received in a control channel. In an embodiment, the parameters related to the group of HARQ processes of the DMC link include an indication of a maximum number of the group of HARQ processes of the DMC link.

Further embodiments provide a system and a method for operating a communications controller for a DMC link for a group of user equipments. For example, embodiments provide a system constructed with a transceiver and a processor coupled to the transceiver. The processor in conjunction with the transceiver is configured to allocate a set of subframes to the group of UEs for the DMC link, signal the set of allocated subframes to the group of UEs, and signal a length of a sliding window to the group of UEs. In an embodiment, UEs of the group of UEs aggregate acknowledgment and negative acknowledgement ("ACK/NACK") feedback for communications over the DMC link according to the length of the sliding window. In an embodiment, the ACK/NACK feedback for the communications over the DMC link is determined independently from ACK/NACK feedback for cellular transmission between the communication controller and the group of UEs. In an embodiment, the length of the sliding window is a number of subframes. In a further embodiment, the length of the sliding window is determined from the allocated set of subframes. In a further embodiment, parameters related to a group of HARQ processes of the DMC link are signaled to the group of UEs. In an embodiment, the ACK/NACK feedback for communications over the DMC link is for the group of HARQ processes of the DMC link. In an embodiment, the signaling the length of the sliding window to the group of UEs is transmitted in a radio resource control signaling message.

Further embodiments provide a system and a method for operating a UE for a DMC link for a group of user equipments. For example, embodiments provide a system constructed with a transceiver and a processor coupled to the transceiver. The processor in conjunction with the transceiver is configured to generate ACK/NACK feedback for a group of HARQ processes over the DMC link, aggregate the ACK/NACK feedback according to a length of a sliding window and an allocation of a first set of subframes for the DMC link received from a communication controller, and transmit the aggregated ACK/NACK feedback to other UEs in the group of UEs of the DMC link on a subframe from an allocation of a second set of subframes received from the communications controller. In an embodiment, the allocation of the second set of subframes is a subset of the allocation of the first set of subframes. In an embodiment, the aggregating the ACK/NACK feedback includes identifying subframes that include the sliding window. In an embodiment, the subframes that include the sliding window include subframes from the allocation of the first set of subframes. In an embodiment, the identifying the subframes that include the sliding window accounts for processing time of processing data over the DMC link. In a further embodiment, HARQ processes of the group of HARQ processes are associated to the identified subframes that include the sliding window. In an embodiment, the aggregating the ACK/NACK feedback includes bundling of ACK/NACK feedback for the associated HARQ processes of the group of HARQ processes. In an embodiment, the aggregating the ACK/NACK feedback includes multiplexing of ACK/NACK feedback for the associated HARQ processes of the group of HARQ processes. In an embodiment, the length of the sliding window is received from the communications controller. In an embodiment, the aggregated ACK/NACK feedback is determined independently from ACK/NACK feedback for cellular transmission between the communications controller and the group of UEs. In an embodiment, the UE receives transmission of other aggregated ACK/NACK feedback on a subframe of the allocation of the first set of subframes that is not part of the allocation of the second set of subframes. In an embodiment, the transmitting the aggregated ACK/NACK feedback further includes transmitting data. In an embodiment, the generating the ACK/NACK feedback further includes generating an acknowledgement for HARQ processes transmitted on the allocation of the second set of subframes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a communications controller for a direct mobile communication (DMC) link for a group of user equipments (UEs), the method comprising:
   allocating a set of subframes to the group of UEs for the DMC link;
   signaling the set of allocated subframes to the group of UEs; and
   indicating a length of a sliding window to the group of UEs for UEs of the group of UEs to aggregate acknowledgment and negative acknowledgement (ACK/NACK) feedback for communications over the DMC link according to the length of the sliding window, wherein the aggregated ACK/NACK feedback retains individual ACK and NACK information;
   wherein the length of the sliding window is determined from the allocated set of subframes, and
   wherein the ACK/NACK feedback for the communications over the DMC link is determined independently from ACK/NACK feedback for cellular transmission between the communication controller and the group of UEs.

2. The method as recited in claim 1 wherein the length of the sliding window is a number of subframes.

3. The method as recited in claim 1 further comprising signaling parameters to the group of UEs related to a group of HARQ processes of the DMC link.

4. The method as recited in claim 3 wherein the ACK/NACK feedback for communications over the DMC link is for the group of HARQ processes of the DMC link.

5. The method as recited in claim 1 wherein the signaling indicating the length of the sliding window to the group of UEs is transmitted in a radio resource control signaling message.

6. A method of operating a user equipment in a group of user equipments (UEs) of a direct mobile communication (DMC) link, comprising:
   generating acknowledgement and negative acknowledgement (ACK/NACK) feedback for a group of HARQ processes over the DMC link;
   aggregating the ACK/NACK feedback according to a length of a sliding window and an allocation of a first set of subframes for the DMC link received from a communication controller,
   wherein the aggregating the ACK/NACK feedback comprises identifying subframes that comprise the sliding window, and wherein the subframes that comprise the sliding window comprise subframes from the allocation of the first set of subframes, and
   wherein the aggregated ACK/NACK feedback retains individual ACK and NACK information; and
   transmitting the aggregated ACK/NACK feedback to other UEs in the group of UEs of the DMC link on a subframe from an allocation of a second set of subframes received from the communications controller,
   wherein the allocation of the second set of subframes is a subset of the allocation of the first set of subframes.

7. The method as recited in claim 6 wherein the identifying the subframes that comprise the sliding window accounts for processing time of processing data over the DMC link.

8. The method as recited in claim 6 further comprising associating HARQ processes of the group of HARQ processes to the identified subframes that comprise the sliding window.

9. The method as recited in claim 8 wherein the aggregating the ACK/NACK feedback comprises bundling of ACK/NACK feedback for the associated HARQ processes of the group of HARQ processes.

10. The method as recited in claim 8 wherein the aggregating the ACK/NACK feedback comprises multiplexing of ACK/NACK feedback for the associated HARQ processes of the group of HARQ processes.

11. The method as recited in claim 6, wherein the length of the sliding window is received from the communications controller.

12. The method as recited in claim 6, wherein the aggregated ACK/NACK feedback is determined independently from ACK/NACK feedback for cellular transmission between the communications controller and the group of UEs.

13. The method as recited in claim 6, wherein the UE receives transmission of other aggregated ACK/NACK feedback on a subframe of the allocation of the first set of subframes that is not part of the allocation of the second set of subframes.

14. The method as recited in claim 6 wherein the transmitting the aggregated ACK/NACK feedback further comprises transmitting data.

15. The method as recited in claim 6 wherein the generating the ACK/NACK feedback further comprises generating an acknowledgement for HARQ processes transmitted on the allocation of the second set of subframes.

16. A communications controller, comprising:
a transceiver; and
a processor unit coupled to the transceiver, the processor unit, in conjunction with the transceiver, configured to cause the communications controller to:
allocate a set of subframes to a group of user equipments (UEs) for a direct mobile communication (DMC) link,
signal the set of allocated subframes to the group of UEs, and
indicate a length of a sliding window to the group of UEs to enable UEs in the group of UEs to aggregate acknowledgment and negative acknowledgement (ACK/NACK) feedback for communications over the DMC link according to the length of the sliding window, wherein the length of the sliding window is determined from the allocated set of subframes, and wherein the aggregated ACK/NACK feedback retains individual ACK and NACK information, and
enable the ACK/NACK feedback for the communications over the DMC link to be determined independently from ACK/NACK feedback for cellular transmission between the communication controller and the group of UEs.

17. A user equipment (UE), comprising:
a transceiver; and
a processor unit coupled to the transceiver, the processor unit, in conjunction with the transceiver, configured to cause the UE to:
generate acknowledgement and negative acknowledgement (ACK/NACK) feedback for a group of HARQ processes over a DMC link,
aggregate the ACK/NACK feedback according to a length of a sliding window and an allocation of a first set of subframes for the DMC link received from a communication controller,
wherein the aggregating the ACK/NACK feedback comprises identifying subframes that comprise the sliding window, and wherein the subframes that comprise the sliding window comprise subframes from the allocation of the first set of subframes, and
wherein the aggregated ACK/NACK feedback retains individual ACK and NACK information, and
transmit the aggregated ACK/NACK feedback to other UEs in a group of UEs of the DMC link on a subframe from an allocation of a second set of subframes received from the communications controller, wherein the allocation of the second set of subframes is a subset of the allocation of the first set of subframes.

18. The UE as recited in claim 17, wherein the processor is further configured to cause the UE to receive transmission of other aggregated ACK/NACK feedback on a subframe of the allocation of the first set of subframes that is not part of the allocation of the second set of subframes.

19. The UE as recited in claim 17, wherein the processor configured to cause the UE to generate the ACK/NACK feedback further comprises the processor configured to cause the UE to generate an acknowledgement for HARQ processes transmitted on the allocation of the second set of subframes.

20. The communications controller as recited in claim 16, further comprising the processor configured to cause the UE to signal parameters to the group of UEs related to a group of HARQ processes of the DMC link.

\* \* \* \* \*